Aug. 14, 1923. Re. 15,675

B. H. SKELLY

LUBRICATING SYSTEM

Original Filed Nov. 10, 1920 2 Sheets-Sheet 1

Inventor
Bernard H. Skelly
Williams, Bradbury McCaleb & Hinkle
Atty.

Aug. 14, 1923. Re. 15,675

B. H. SKELLY

LUBRICATING SYSTEM

Original Filed Nov. 10, 1920 2 Sheets-Sheet 2

Inventor
Bernard H. Skelly

Williams, Bradbury, McCaleb & Pierce

Attys.

Reissued Aug. 14, 1923. Re. 15,675

UNITED STATES PATENT OFFICE.

BERNARD H. SKELLY, OF BRIDGEPORT, CONNECTICUT, ASSIGNOR TO THE BASSICK MANUFACTURING COMPANY, OF CHICAGO, ILLINOIS, A CORPORATION OF DELAWARE.

LUBRICATING SYSTEM.

Original No. 1,372,565, dated March 22, 1921, Serial No. 423,086, filed November 10, 1920. Application for reissue filed March 20, 1923. Serial No. 626,422.

*To all whom it may concern:*

Be it known that I, BERNARD H. SKELLY, a citizen of the United States, residing at Bridgeport, in the county of Fairfield and State of Connecticut, have invented certain new and useful Improvements in Lubricating Systems, of which the following is a specification.

This invention pertains to lubricating systems and is designed more particularly to facilitate the introduction of fluid lubricant, as oil, to bearings or members requiring lubrication through a suitable element attached to and carried by the bearing or member to be lubricated.

While the system has a wide field of application, it is designed primarily for use in applying oil to the various bearings of motor vehicles, and does away with the necessity of grease cups and the charging apparatus therefor, such as grease guns, some of which are designed to be successively interlocked to the various cups to charge the same at which time the gun is manually operated to force the grease to place.

The main object of the invention may be said to reside in the provision of means which, when manually held in proper juxtaposition with the member or bearing requiring lubrication, will automatically force the oil to place, the feed of oil immediately ceasing the moment the oil conducting member or element is manually withdrawn from operative position or relation.

The system is entirely automatic aside from the mere manual operation of presenting and holding a nozzle to the nozzle guide or receiving member attached to the element to be oiled.

Figure 1:
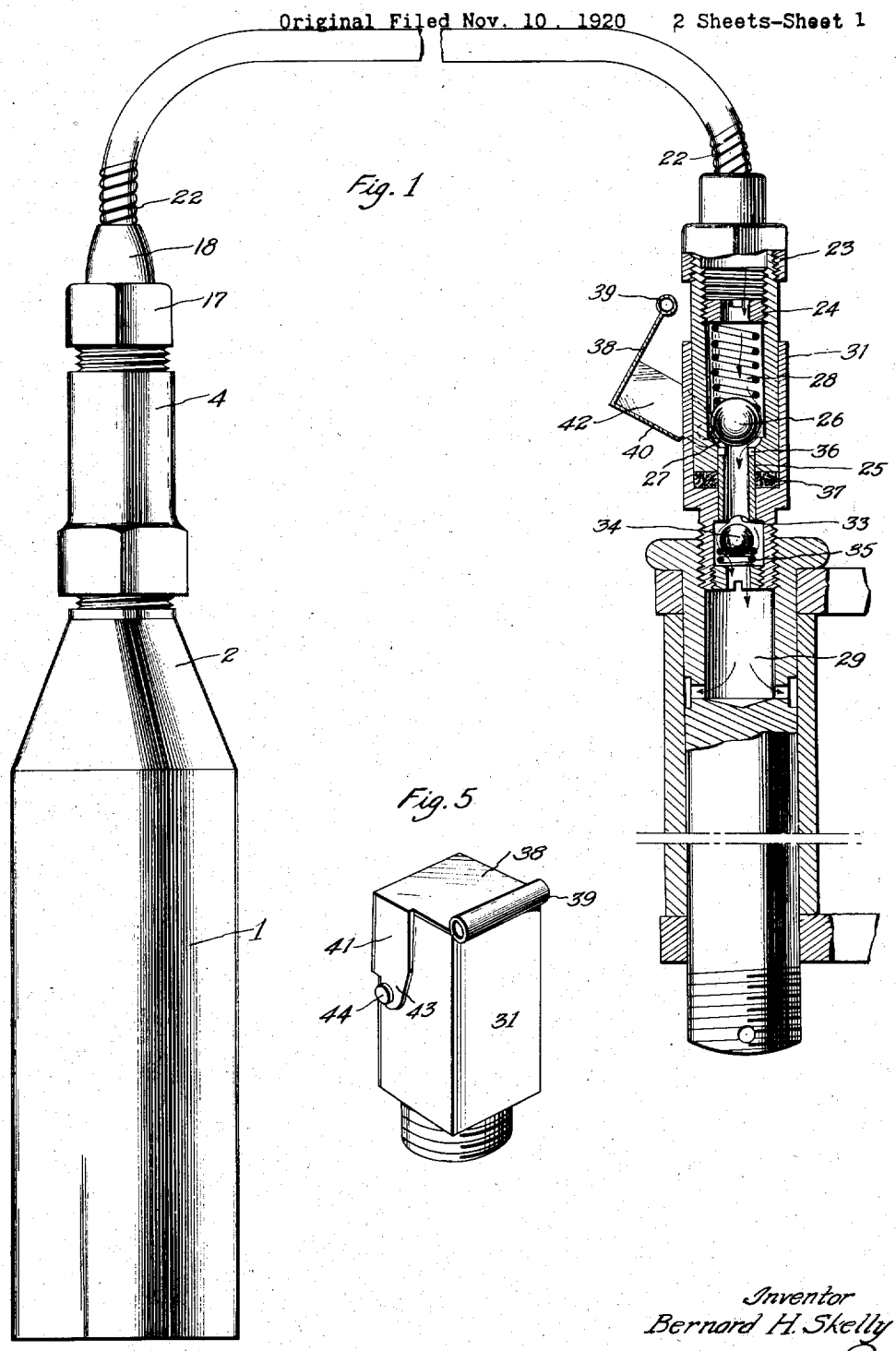

One embodiment of the invention which has been successfully used is disclosed in the annexed drawings, wherein:

Figure 1 is a sectional elevation of the structure, the same being disclosed in operative relation to a shackle bolt with the valves unseated and the oil flowing as indicated by the arrows to the oil passage in the bolt.

Figures 2, 3, 4:
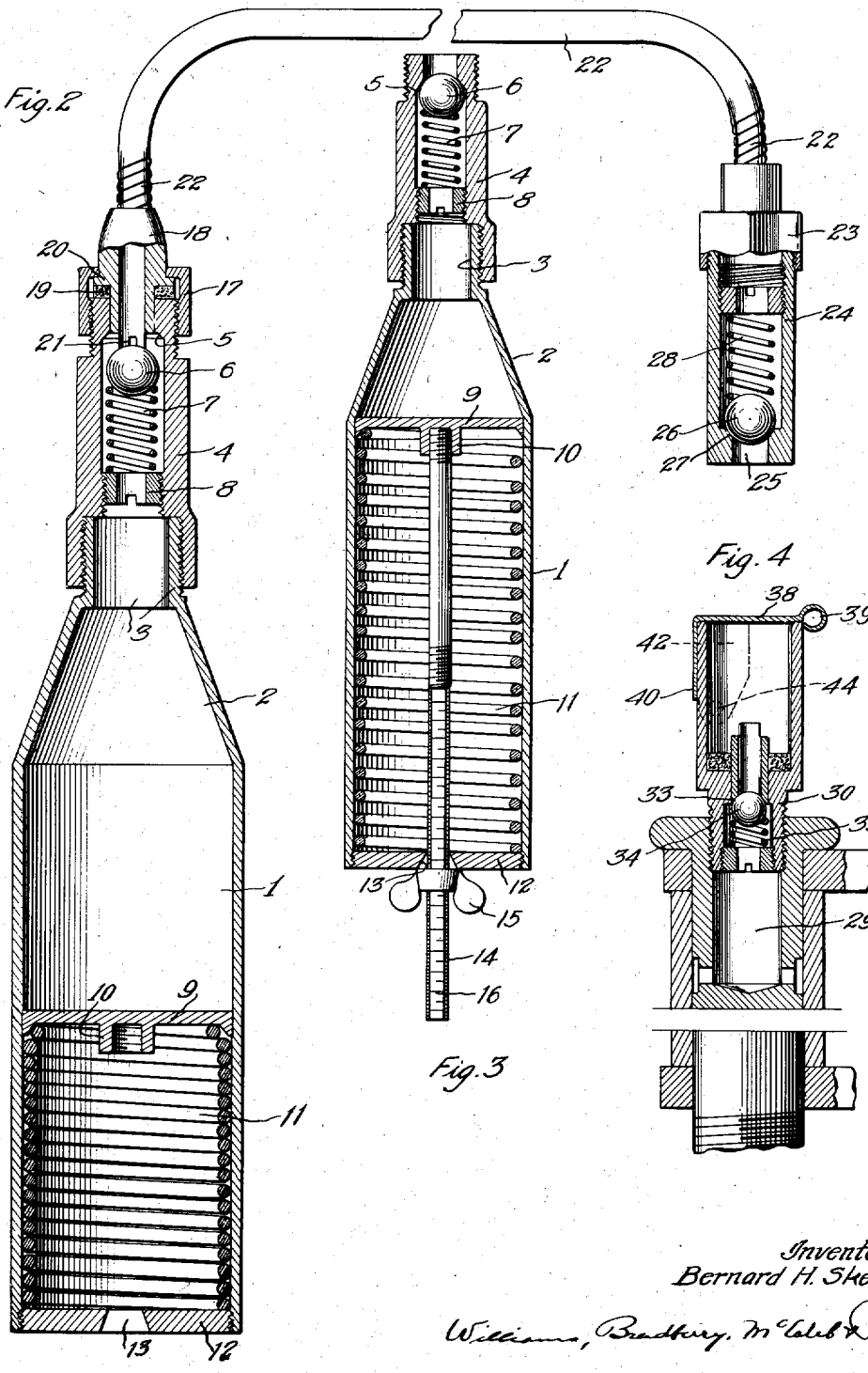

Figure 2 a sectional view of the reservoir containing the nozzle and the flexible conduit (the latter in full lines) extending from the reservoir to the nozzle, it being assumed that the reservoir is full of oil under compression through the action of the spring urged piston.

Figure 3 a sectional view of a container from which the oil is exhausted, the conduit disconnected therefrom, and a draw rod attached to the piston for the purpose of retracting the same for recharging purposes.

Figure 4 a sectional view of the nozzle receiving member with its cap or closure thereover, and Figure 5 a perspective view of such member.

In the drawings, 1 denotes a reservoir, the main body whereof is cylindrical in form. The upper portion of the reservoir is tapered or conical as at 2 and terminates in a threaded nipple 3. A hollow fitting or extension piece 4 is screwed upon the nipple, the fitting having adjacent its outer end an interiorly arranged valve seat 5 against which a valve 6 is normally held by a spring 7 interposed between the valve and a threaded plug 8 having an opening therethrough.

Mounted within the cylindrical portion of the reservoir is a piston 9 provided on its under face with a centrally disposed interiorly threaded stud 10.

A spring 11 underlies the piston, the spring at its lower end bearing against a head 12 screwed or otherwise secured in the lower end of the body 1, and provided with a centrally disposed aperture 13. Said aperture is provided for the introduction of a draw rod 14, the inner end whereof is threaded and engages the stud 10, see Fig. 3. The rod is threaded from about its center to its outer end for the reception of a wing nut 15 which, when it is turned up, draws the rod outwardly and retracts the piston, putting the spring 11 under compression. When the piston is thus lowered, the reservoir above the piston is filled with oil, either directly through the nipple 3, if the fitting 4 is removed, or through the fitting by forcing the valve 6 from its seat as by the introduction of the nozzle of an oil can or pump. When this is effected, the rod 14 may be removed. Inasmuch as one cannot tell from an inspection of the cylinder just how much oil it may contain, rod 14 is flattened, as at 16, and graduations placed thereon, thus forming a scale or index from which the oil content of the cylinder may be readily determined by merely passing the rod through opening 13 until it abuts the stud 10.

The degree of compression of the spring and the position of the piston is also determinable by reading the scale as the rod is drawn outwardly under the action of the wing nut.

When the rod is removed and the spring consequently released, the piston forces the oil upwardly and the oil co-acts with spring 7 to force and hold the valve 6 to its seat.

The upper end of fitting 4 is threaded, and a nut or threaded collar 17 is adapted to engage therewith, said nut forcing and holding to place a spigot member 18, a packing washer 19 being interposed between a shoulder 20 on the spigot and the upper end of fitting 4.

The spigot is of such length that its inner or lower end extends beyond the valve seat 5 and consequently moves the valve away from its seat. Said inner end is cut away as at 21 so that the oil may pass around the valve and outwardly through the spigot. A flexible conduit 22 is connected to the outlet of the spigot and extends and is connected to a cap piece 23 which in turn is secured to a nozzle 24. Said nozzle which is preferably circular in cross section, is hollow and is provided with an end discharge aperture 25 normally closed by a valve 26 held to a seat 27 by a spring 28. The valve 26 prevents passage of any oil from the cylinder and conduit until it is unseated, the oil under pressure assisting the spring in this action. The oil under pressure immediately passes into the conduit when the spigot 18 is secured in place on the reservoir.

29 denotes a shackle bolt, which, as will be understood, is the equivalent of any other member to be lubricated, said bolt having mounted in the outer end of a bore formed therein a receptacle or receiver comprising a threaded hollow stem 30 and a body 31.

The body is hollow and of an internal diameter such that the nozzle 24 may be readily inserted therein and as readily withdrawn. Mounted within the lower wall of the receiver is a tubular member 32, the lower end of which is fashioned with a seat 33 for a valve 34 normally held thereagainst by a spring 35. The tube or tubular member extends upwardly into the body portion 31 and is cut away at its sides as at 36. A seat or packing ring 37, such as cork, is located in the bottom of the receptacle and co-acts with the nozzle when the latter is inserted in the receptacle, see Fig. 1.

A suitable cap or closure is preferably, though not necessarily, provided for the closure to prevent ingress of dirt and dust. An effective cap is disclosed herein, see Figs. 1, 4 and 5, and may be said to comprise a top 38 having a curled or rounded spring lip 39 at one edge, a front or stop face 40, and oppositely disposed side walls 41 and 42, the latter having ears 43 formed as extensions thereof. Pins or screws 44 pass through the ears into the body 31, said pins being located to one side of the medial line of the body so that the cap may be swung to its open and closed position, the lip 39, when the cap is closed, hugging the edge of the body 31 and maintaining the cap against accidental opening. Any form of cap may, of course, be employed.

The body of the reservoir is made of strong material so as to withstand hard usage and to prevent deformation thereof which would interfere with the action of the piston 9. It is designed to have the filled reservoirs kept in stock so that the user of the apparatus may turn in his exhausted reservoir and receive a filled one in its place. Egress of the oil from the reservoir kept in stock is prevented by the valve 6 and the user merely disconnects the spigot from his exhausted reservoir and couples it into the charged one. In the act of coupling, the inner notched end of the spigot contacts the valve and removes and holds it from its seat, the oil flowing outwardly through the then coupled spigot, through conduit 22 and into the nozzle where its flow is arrested by the valve 26. The apparatus is then ready for use and all that the operator has to do is to swing the cap to open position and insert the nozzle into the receptacle or receiver 31. As the lower end of the nozzle contacts washer 37, the upper notched end of the fixed tubular member which passes into opening 25 contacts the valve 26 and moves the same upwardly away from its seat. The oil under pressure may then pass from the nozzle, and flowing through tube 32 forces valve 34 from its seat and continues on to the element to be lubricated.

For ordinary lubrication the nozzle need be held in place only momentarily, and, as will be readily appreciated, the lubrication will be speedily effected. No manual operation other than the mere placement of the nozzle within the nozzle receiver or receptacle takes place, the opening and closing of the valves being automatic, and the oil automatically flowing under pressure from the reservoir. The system as above set forth does away with the use of grease cups and manually actuated grease guns and the various annoyances incident to their use.

If desired, the amount of oil which is to be passed to the element to be lubricated may be determined by the use of rod 14 and nut 15. The rod being connected to the piston, nut 15 will be turned up thereon and left standing away from the base a determined distance, which distance may be readily ascertained by reading the scale 16; the nozzle being then positioned and the valve 26 opened, the oil will continue to flow until the movement of the piston is arrested by the nut 15 contacting the head 12.

From the above description it will clearly appear that with my apparatus whether used without, or with the rod 14 and the nut 15 to predetermine the quantity of lubricant delivered to the element to be lubricated, provides means for constantly exerting pressure upon the lubricant tending to automatically expel it from the reservoir whenever the valve 26 is opened.

The terms "upper" and "lower" as employed in connection with the various elements are merely relative and are not to be taken in any sense as terms of limitation.

Furthermore in the broad aspect of the invention, the nozzle receptacle may be omitted so long as means is provided for opening the valve in the nozzle and conducting the oil to the member to be lubricated.

What is claimed is:

1. In combination with an element to be lubricated; an oil reservoir; means located within the reservoir for constantly and automatically exerting pressure on the oil to force the same outwardly therefrom; a flexible conduit extending from the reservoir; a valve serving to close the outer end of the conduit; and a manually maintained and separable joint between said conduit and the element to be lubricated, one element of said joint effecting the opening of the valve when, and only as long as the joint remains closed under the action of manually exerted pressure.

2. In a lubricating system, the combination of an element to be oiled; an oil reservoir; automatically actuated means located wholly within the reservoir for constantly exerting pressure on the oil to force the same from the reservoir; a flexible conduit extending therefrom; a valve located at the outer end of the conduit; a sliding separable joint between said conduit and the element to be lubricated; and means effecting an unseating of the valve when the elements of said joint are brought together and manually so held or maintained whereby an immediate automatic oiling is effected and the amount of oil allowed to pass is controlled and regulated by the period of time the joint is manually maintained.

3. In a lubricator, the combination of an oil reservoir; means located wholly within the reservoir for constantly and automatically exerting pressure upon the oil therein to force the same outwardly; a conduit extending therefrom; a nozzle carried at the outer end of the conduit; a valve located in the nozzle for normally closing the same; an element to be lubricated; a receptacle secured thereto, said receptacle being of such dimension as to make a relatively close fit with the nozzle when the latter is inserted therein; and a tubular member extending upwardly into said receptacle and adapted to pass through an opening formed in the nozzle and to unseat the valve therein when the parts are brought into close relation through a manual positioning whereby an immediate automatic oiling is effected and the amount of oil allowed to pass is controlled and regulated by the period of time the joint is manually maintained.

4. In combination with an element to be lubricated, an oil reservoir; means located within the reservoir for constantly and automatically exerting pressure on the oil to force the same outwardly therefrom; a conduit extending from the reservoir; a valve serving to close the outer end of the conduit; and a manually maintained and separable joint between said conduit and the element to be lubricated, one element of said joint effecting the opening of the valve when and only as long at the joint remains closed under the action of manually exerted pressure.

5. In a lubricating system the combination of a reservoir; means contained therein for holding oil in the reservoir under pressure; a hollow fitting attached to the discharge end of the reservoir; a valve serving to normally close the same; a spigot arranged to be secured to the fitting, said spigot having a projection adapted when the spigot is positioned to unseat the valve; a conduit extending from the spigot; a nozzle carried by the conduit; and a valve serving to close the nozzle.

6. In a lubricating system the combination of a reservoir; means contained therein for holding oil in the reservoir under pressure; a hollow fitting attached to the discharge end of the reservoir; a valve serving to close the same; a spigot arranged to be secured to the fitting; said spigot having a projection adapted when the spigot is positioned to unseat the valve; a conduit extending from the spigot; a nozzle carried by the conduit; a valve serving to close the nozzle, and a nozzle receiving element adapted to be secured to the element to be lubricated, said receiving element embodying means to unseat the nozzle valve when the nozzle is pushed to place.

7. In combination with an element to be lubricated, a lubricant reservoir, a piston in said reservoir for placing the lubricant in said reservoir under pressure, a spring for exerting pressure on said piston, means extending through one wall of said reservoir for placing said spring under tension, a conduit extending from said reservoir, a valve for controlling the flow of lubricant through said conduit, and a manually maintained and separable joint between said conduit and said element to be lubricated, comprising means for effecting the opening of said valve, when, and only as long as, the joint remains closed under the action of manual pressure exerted toward said element to be lubricated.

8. In combination with an element to be lubricated, a lubricant reservoir, a conduit extending from said reservoir, a valve for controlling the flow of lubricant through said conduit, means for automatically forcing lubricant through said conduit when said valve is open, means for forming a manually maintained and separable joint between said conduit and said element to be lubricated, comprising means for effecting the opening of said valve, when, and only so long as, the joint remains closed under the action of manual pressure exerted toward the element to be lubricated.

9. The combination with an element to be lubricated, of a lubricant reservoir having a conduit extending therefrom, a valve for controlling the passage of lubricant through said conduit, means for automatically forcing a predetermined quantity of lubricant through said conduit when said valve is open and relieving the pressure on said valve when said predetermined quantity of lubricant has been discharged, and means operable by pressure exerted toward said element for maintaining a sealed connection between said conduit and said element and for holding said valve open only so long as manually maintained pressure is exerted toward said element to be lubricated.

Signed at Bridgeport, Conn., this 26 day of March, 1923.

BERNARD H. SKELLY.

Witnesses:

FRANK P. SARGENT,
JOHN E. MULLER.